United States Patent [19]

Brown et al.

[11] Patent Number: 4,916,171

[45] Date of Patent: Apr. 10, 1990

[54] POLYMERS COMPRISING ALKALI-INSOLUBLE CORE/ALKALI-SOLUBLE SHELL AND COPOSITIONS THEREOF

[75] Inventors: Albert B. Brown; Paul H. Gehlhaus, both of Warrington; William H. Harrop, Elverson; Dennis P. Lorah, Lansdale; Thomas G. Madle, Flourtown; Travis E. Stevens, Ambler; Ted Tysak; Constance A. Lane, both of Philadelphia, all of Pa.

[73] Assignee: Rohm and Haas Company, Independence Mall West, Del.

[21] Appl. No.: 93,069

[22] Filed: Sep. 1, 1987

Related U.S. Application Data

[63] Continuation-in-part of Ser. No. 872,714, Jun. 10, 1986, abandoned, which is a continuation-in-part of Ser. No. 634,333, Jul. 25, 1984, abandoned.

[51] Int. Cl.$^4$ .................................................. C08L 51/00
[52] U.S. Cl. ..................................... 523/161; 523/201; 523/206; 524/504; 524/533; 525/301; 525/309; 525/902
[58] Field of Search ................... 523/201, 206, 161; 525/301, 309, 902; 524/504, 533, 160

[56] References Cited

U.S. PATENT DOCUMENTS

| | | | |
|---|---|---|---|
| 3,073,791 | 1/1963 | Barkhuff | 523/201 |
| 3,282,876 | 11/1966 | Williams et al. | 523/201 |
| 3,329,628 | 7/1967 | Blyth | 523/201 |
| 4,207,094 | 5/1981 | Huhn et al. | 523/201 |
| 4,325,856 | 4/1982 | Ishikawa et al. | 523/201 |
| 4,427,836 | 1/1984 | Kowalski et al. | 525/902 |
| 4,584,231 | 4/1986 | Knoop | 525/902 |

FOREIGN PATENT DOCUMENTS

| | | | |
|---|---|---|---|
| 2722752 | 4/1978 | Fed. Rep. of Germany | 523/201 |
| 57-26198 | 2/1982 | Japan | 523/201 |

*Primary Examiner*—Allan M. Lieberman
*Attorney, Agent, or Firm*—Carl W. Battle

[57] ABSTRACT

Disclosed herein are core-shell polymers having an alkali-insoluble, emulsion polymer core and an alkali-soluble, emulsion polymer shell attached or associated with said core so that upon dissolving said shell with alkali, a portion of said shell remains attached or associated with said core. Also disclosed are compositions wherein said shell polymer has been neutralized and substantially, but not totally, dissolved so as to form a blend of neutralized core-shell polymer and an aqueous solution of neutralized shell polymer.

22 Claims, No Drawings

POLYMERS COMPRISING ALKALI-INSOLUBLE CORE/ALKALI-SOLUBLE SHELL AND COPOSITIONS THEREOF

CROSS REFERENCE TO RELATED APPLICATIONS

This is a continuation-in-part of application Ser. No. 872,714, filed June 10, 1986, now abandoned, which is a continuation-in-part of application Ser. No. 634,333, filed July 25, 1984, now abandoned.

BACKGROUND OF THE INVENTION

This invention relates to polymer coatings, such as pigmented paints and clear overprint varnishes. It further relates to letdown vehicles used in aqueous flexographic inks and to partial or sole vehicles used in gravure and general ink formulations. Additionally it relates to polymer coatings for leather or leather substitutes, especially those applied to serve as an embossing release coat and a final topcoat, and to improved floor polishes and cement compositions.

In the field of paints and varnishes, as well as in the field of floor finishes and inks, mixtures or blends of alkali-soluble polymers with alkali-insoluble polymers have been utilized for many years. The alkali-soluble polymers are generally prepared by solution polymerization, although they can also be prepared by emulsion or dispersion polymerization techniques. U.S. Pat. No. 3,037,952 is typical of this technology.

European Patent Application Publication No. 0207854 A1 discloses a storage-stable coating composition containing core-shell polymer particles containing (A) 95-99% by weight of at least one $C_1$—$C_8$ alkyl acrylate or methacrylate and (B) 1-5% by weight of at least one watersoluble monomer.

While said prior art systems are quite useful and commercially successful, improvements in the area of water resistance, heat seal resistance, block resistance, rheology, stability and efficiency in preparation have been desired. The prior systems generally could not be prepared with more than about 35% by weight alkali-soluble polymer, whereas it has been desired to prepare up to 60% by weight alkali-soluble polymer.

In the printing ink field letdown vehicles have been used commercially in pigment dispersions for flexographic inks for some time. Such dispersions are usually prepared in emulsion and are high in styrene content. They are added to adjust viscosity, give the ink proper rheology, and aid in dry time, resistance properties, and film formation of the final dried ink formulation. The pigment dispersions generally comprise solvent- or emulsion-based resins of low molecular weight and high acid content. Many process and stability problems have been experienced with these dispersions which can be eliminated by the use of the core-shell polymers of the present invention.

Acrylic and modified-acrylic latex polymers containing copolymerized acid groups, often treated with zinc or other ions, are well known as components of floor polish vehicles. U.S. Pat. Nos. 3,328,325 and 4,517,330 disclose such floor polishes containing acrylic polymers. The core-shell polymers of this invention are useful in the floor polish applications and exhibit better gloss performance than the acrylic-containing floor polishes known in the prior art.

In the field of leather embossing coatings, nitrocellulose lacquer emulsions have traditionally been used for many years. Although these lacquer systems are commercially useful, improvements in the areas of product stability, application rheology, gloss, fill, lower organic solvent content and non-flammability are desired. Water-based coatings containing the core-shell polymers of this invention give advantages in all these areas.

It is an object of the present invention to provide core-shell polymers and compositions thereof which exhibit good rheology and ease of application and which are stable, water resistant, heat-seal resistant, and efficiently prepared by a process which permits levels of alkali-soluble polymer up to about 60% by weight. It is a further object to provide core-shell polymers which can be readily and inexpensively isolated from emulsion and utilized in improved cement formulations. It is also a further object of this invention to provide core-shell polymers and compositions thereof which are useful in various applications, such as inks, varnishes, paints and other interior or exterior architectural coatings, leather coatings, cement compositions and floor polishes by virtue of their improved gloss, high temperature modulus, and other superior properties.

These objects, and others as will become apparent from the following description, are achieved by the present invention which comprises in part a composition comprising a core-shell polymer having an alkali-insoluble, emulsion polymer core and an alkali-soluble, emulsion polymer shell attached or associated with said core so that, upon dissolving said shell with alkali, a small portion of said shell remains attached or associated with said core.

SUMMARY OF THE INVENTION

This invention relates to novel core-shell polymers and compositions thereof which are useful in paints, overprint varnishes, inks, leather coatings, cements, and floor polishes. The core-shell polymers have an alkali-insoluble, emulsion polymer core and an alkali-soluble, emulsion polymer shell attached or associated with said core so that, upon dissolving said shell with alkali, a portion of said shell remains attached or associated with said core. The core-shell polymers preferably have a weight ratio of core polymer to shell polymer from about 80:20 to about 20:80. The polymers are polymerized from monomer systems comprised of monomers selected from methyl acrylate, ethyl acrylate, butyl acrylate, 2-ethylhexyl acrylate, decyl acrylate, methyl methacrylate, ethyl methacrylate, butyl methacrylate, styrene and substituted styrene, acrylonitrile, acrylic acid, methacrylic acid, itaconic acid, maleic acid, fumaric acid, vinyl acetate and other $C_1$-$C_{12}$ alkyl acrylates.

In another aspect the invention comprises a composition wherein said shell polymer has been neutralized and substantially, but not totally, dissolved so as to form a blend of neutralized core-shell polymer and an aqueous solution of neutralized shell polymer. The invention is also the process for making said compositions.

DETAILED DESCRIPTION OF THE INVENTION AND THE PREFERRED EMBODIMENTS

The unique polymer compositions of this invention (referred to herein by the acronym SSP, standing for soluble shell polymer) have improved performance and stability over prior art blends; one particular use is in clear overprint varnishes which exhibit high gloss, water resistance, high temperature and heat-seal resistance in films, and superior rheological properties to the prior art blends. The compositions are especially useful as coatings over fibrous substrates such as paper, paper board, and leather which have been previously printed with various types of inks. In one important application, where such coated paper is over-packaged with cellophane which requires a heat seal operation, it is especially important that the coating be heat seal resistant.

The compositions of this invention comprise a core-shell polymer having an alkali-insoluble emulsion polymer core and an alkali-soluble emulsion polymer shell attached or associated with said core, so that upon dissolving such shell with alkali a portion of said shell remains attached or associated with said core.

Suitable monomers for the core and shell polymers are methyl acrylate, ethyl acrylate, butyl acrylate 2-ethylhexyl acrylate, decyl acrylate, methyl methacrylate, ethyl methacrylate, butyl methacrylate, acrylic acid, methacrylic acid, itaconic acid, maleic acid, fumaric acid, styrene, substituted styrene, acrylonitrile, vinyl acetate, other $C_1$ to $C_{12}$ alkyl acrylates, and the like.

Preferably catalyst in the range of about 0.05 to 1%, more preferably about 0.05% to 0.35%, by weight is employed to obtain a relatively high molecular weight core polymer. It is preferred that a low level of acid-containing monomer or none be contained in the monomer mixture which is polymerized to become the core polymer. Normally, low levels of an acid-containing monomer are required for stability of the emulsion particles. The core monomer system preferably contains less than 3% by weight acid-containing unsaturated monomer and, in the case of methacrylic acid, preferably none or 0.01% to about 1.5% and, in some embodiments, preferably about 0.3% to about 0.7% by weight. Other unsaturated acid monomers than methacrylic acid can also be used, for example acrylic acid, itaconic acid, maleic acid and the like.

Preferably the molecular weight of the core polymer is higher than that of the shell polymer, and more preferably the core polymer has a molecular weight greater than 50,000 weight average as determined by gel permeation chromatography.

The $T_g$ of the core polymer is preferably about $-20°$ C. to about $30°$ C. and, when it is polymerized first, it is polymerized preferably to a particle size of about 60 to about 140 nm. Due to its relative hydrophobicity versus that of the shell polymer, the core polymer can also be polymerized second, and when it is polymerized second it becomes a domain within the particles of the alkali-soluble shell polymer. It is also possible to prepare the core polymer in two or more stages with varying compositions.

The weight ratio of core polymer to shell polymer can range from about 99:1 to about 1:99. Preferably the weight ratio of core polymer to shell polymer is about 80:20 to about 20:80, more preferably about 65:35 to 35:65, and most preferably about 60:40 to about 40:60. The shell polymer preferably has a molecular weight of about 5,000 to about 50,000 weight average as determined by gel permeation chromatography, and has a $T_g$ preferably of at last about 100° C. The shell polymer is preferably polymerized from a mixture of unsaturated monomers comprising about 10% to about 60% by weight acid-containing unsaturated monomer. The preferred acid-containing monomer is methacrylic acid, and the preferred amount thereof is about 20% to about 50% by weight. As mentioned for the core polymer, other unsaturated acid-containing monomers can also be used.

The other unsaturated monomers in the monomer mixture which polymerizes to become the shell polymer are as mentioned above, but about 40% to about 90% by weight methyl methacrylate is preferred.

Based on equivalents of acid in the shell polymer, preferably about 0.8 to about 1.5 equivalents of base are introduced to neutralize and substantially, but not totally, dissolve the shell polymer so as to form a blend of neutralized core-shell polymer and an aqueous solution of neutralized shell polymer. We have found that our method leaves some of the shell polymer still closely associated with, or attached to, the core. Most of the neutralized shell polymer is free floating in the aqueous solution, but some remains attached to the core in what is believed to be the form of cilia or hair-like protrusions.

The base can be any, but is preferably selected from the group consisting of ammonia, triethylamine, monoethanolamine, and dimethylaminoethanol.

As mentioned before, the resultant compositions have many uses, but a preferred one is heat-resistant, clear overprint varnishes for which these compositions are exceptionally suitable. Other uses include binders for paints and other pigmented architectural coatings, letdown vehicles for flexographic inks, partial or sole vehicles for gravure and general-purpose inks, coatings for leather embossing, additives for cement, and vehicles for floor polishes.

In paint formulations, the core-shell polymers of this invention can be used at levels based on weight of solids ranging from about 5% to about 40%, preferably about 15% to about 30%, of the total weight of the paint formulations. These core-shell polymers result in improved block resistance, gloss and open-time of the paints.

The paint formulations within which the core-shell polymers of this invention are useful may include conventional additives such as pigments, fillers, dispersants, wetting agents, coalescents, rheology modifiers, drying retarders, biocides, anti-foaming agents and the like.

The core-shell polymers are particularly useful as modifiers for cement mortars. The core-shell polymers are useful in cement compositions either as an emulsion or as dry polymer particles. The polymers are preferably used in dry form and are easily isolatable by conventional methods, such as spray drying, to yield dry, free-flowing powders, which upon admixture with cement mortars provide superior performance characteristics.

In ink applications, the core-shell polymers are useful as a letdown vehicle. The polymers are beneficial for rheology, drink (ability to be diluted without loss of viscosity) and stability for a wide variety of inks, particularly aqueous flexographic printing inks. The preferred core-shell polymers for use in flexographic inks are those containing a polystyrene core.

The core-shell polymers of this invention can be formulated and applied to leather or leather substitutes by spray or roll coating to serve as an embossing release coat or a final topcoat or finish. The unique compositional feature of the core-shell polymers produce films that possess a high temperature modulus needed for the embossing process. The core-shell polymers can be blended with other multistage acrylic emulsions to obtain desirable properties such as improved flex and adhesion without loss of embossing properties.

In order to further illustrate this invention the following examples, in which all parts and percentages are by weight unless otherwise indicated, are presented. However it should be understood that the invention is not limited to these illustrative examples.

EXAMPLES

Example 1—Preparation of Core-Shell Polymer

A stirred reactor containing 845 grams deionized water (D.I.) and 2.7 grams of sodium lauryl sulfate was heated to 82° C. After addition of 2.25 grams ammonium persulfate, the two monomer emulsions ("M.E.") listed in the table below were slowly added sequentially at 82° C. over a period of 90 minutes each, with a 30 minute hold between the two stages to assure about 97% conversion of the first stage monomers. A solution of 1.35 grams ammonium persulfate in 125 grams water was added simultaneously with the first stage monomers, and a solution of 1.8 grams ammonium persulfate in 125 grams water was added with the second stage monomers. The last traces of monomer were polymerized by addition of a redox chaser, (1.0 grams t-butyl hydroperoxide, 0.5 sodium sulfoxylate formaldehyde, 35 grams water and 5 ml of 0.15% ferrous sulfate heptahydrate) added at 55° C. Residual mercaptan was oxidized with 30 grams of 10% hydrogen peroxide.

The core monomer system contained 1.5% acid-containing monomer and the shell monomer system contained 20% acid-containing monomer.

|  | M.E. #1 (core) | M.E. #2 (shell) |
|---|---|---|
| D.I. Water | 300 | 300 |
| Sodium Lauryl Sulfate | 9.0 | 6.3 |
| Butyl Acrylate (BA) | 585 | — |
| Methyl Methacrylate (MMA) | 301.5 | 720 |
| Methacrylic Acid (MAA) | 13.5 | 180 |
| Methyl 3-Mercaptoproprionate (MMP) | — | 27 |
| Water, rinse | 100 | 100 |
| Final % Solids | 39.8% | 47.3% |
| pH | — | 2.2 |
| Particle Size, nm | 82 | 108 |
| Molecular weight, Mw (GPC) | $71.0 \times 10^6$ | 10,000 |

Example 2—Neutralization of Shell Polymer

After dilution of the core-shell polymer from Example 1 to about 35% solids, it was neutralized to a pH about 8–8.5 with aqueous ammonia. On heat aging the neutralized latex for ten days at 60° C. (140° F.), there was little or no change in particle size or performance as a clear, overprint varnish. Films exhibited excellent gloss on porous substrates and a reasonable degree of heat seal resistance (125° C.), and water resistance.

Example 3—Preparation of Core-Shell Polymers Having Varying Compositions

Using the process of Examples 1 and 2, the weight % shell polymer was varied from 30–60%, the acid content of the shell polymer was varied from 10–40%, the acid content of the high molecular weight core polymer was varied from 0–1.5%, and the molecular weight of the shell polymer was varied from 8,000 to about 50,000 with hydrophilic chain transfer agents (CTA's) such as the methyl ester of 3-mercaptopropionic acid, or hydrophobic CTA's, such as lauryl mercaptan.

Example 4—Preparation of Shell Polymer and Neutralizing Shell at Elevated Temperatures A stirred reactor containing 676 grams deionized water, 2.16 grams sodium lauryl sulfate and 3.6 grams sodium acetate trihydrate was heated to 81° C. After addition of 1.8 grams ammonium persulfate, the two monomer emulsions (M.E.) given in the table below were added sequentially at 82° C. over a period of 90 minutes each, with a 30-minute hold between the stages. The cofeed catalyst solutions for stage one (core) was 1.08 grams ammonium persulfate in 100 grams water, and for stage two (shell) was 2.16 grams ammonium persulfate in 150 grams water.

After completion of the polymerization, the reaction was cooled at 45°–50° C. and diluted with 440 grams deionized water. A 15% solution of aqueous ammonia (205 grams) then added over a period of 10 to 15 minutes. The last traces of monomers and mercaptan were eliminated as in Example 1.

|  | M.E. #1 (core) | M.E. #2 (shell) |
|---|---|---|
| D.I. Water | 240 | 240 |
| Sodium Lauryl Sulfate | 8.64 | 3.6 |
| Butyl Acrylate (BA) | 468 | — |
| Methyl Methacrylate (MMA) | 244.8 | 576 |
| Methacrylic Acid (MAA) | 7.2 | 144 |
| Methyl 3-Mercaptopropionate (MMP) | — | 21.6 |
| Water, rinse | 100 | 100 |
| Molecular weight, Mw (GPC) | >800,000 | 11,000 |
| Final Solids | 39.7 | 38.4 |
| pH | — | 8.3 |
| Particle Size, nm | 92 | 93 |
| Viscosity, 3/30, cps | — | 806 |

After heat aging the latex at 60° C. for ten days, the particle size of the dispersion was 106 nanometers and there was little change in the performance characteristics of film clarity, rheology index, and heat seal resistance as a clear, overprint varnish.

Example 5—Inverse Polymerization Procedure of Preparing Core-Shell Polymer

In this procedure the shell polymer was prepared first, followed by polymerization of the core polymer. With this procedure there was more efficient use of the chain transfer agent for controlling molecular weight of the shell polymer.

A stirred reactor, containing 1250 grams D.I. water, 9.0 grams sodium lauryl sulfate and 5.4 grams sodium acetate trihydrate, was heated to 82° C. After addition of 1.35 grams of ammonium persulfate, the two monomer emulsions (M.E.) listed below were added sequentially over a period of about 90 minutes each, with a hold of 30 minutes between the two stages. Residual monomers and mercaptans were removed as in Example 1.

|  | M.E. #1 (shell) | M.E. #2 (core) |
|---|---|---|
| D.I. Water | 300 | 300 |
| Sodium Lauryl Sulfate | 4.5 | 9.0 |
| Methyl Methacrylate (MMA) | 720 | 315 |
| Methacrylic Acid (MAA) | 180 | — |
| Methyl 3-Mercaptopropionate (MMP) | 27 | — |
| Butyl Acrylate (BA) | — | 585 |
| D.I. Water, rinse | 100 | 100 |

-continued

|  | M.E. #1 (shell) | M.E. #2 (core) |
|---|---|---|
| Ammonium Persulfate/D.I. Water | 2.25/100 | 1.8/125 |

Example 6—Preparation of Core-Shell Polymers Having Varying Compositions

Following the procedures of Example 5, core-shell polymers with the first stage (shell) composition varying from 65-80% MMA and 20-35% MAA were prepared with either lauryl mercaptan or the methyl ester of 3-mercaptopropionic acid as the chain transfer agent (CTA) for the first stage. Properties are summarized in the tables below. Very high levels of acid in the shell portion of the polymer tended to cause particle aggregation, especially with hydrophilic CTA's. Particle size grow-out indicated no new particles were found on polymerization of the second stage (confirmed by electron microscopy).

| Example | 6 A | 6 B | 6 C | 6 D |
|---|---|---|---|---|
| First Stage (Shell) | | | | |
| MMA/MAA Ratio | 65/35 | 70/30 | 75/25 | 80/20 |
| CTA | 3% MMP | 3% MMP | 3% MMP | 3% MMP |
| % Solids | 35% | 35% | 35% | 35% |
| Particle Size, nm | 158 | 104 | 79 | 86 |
| Final Core-Shell Polymer | | | | |
| % Solid | 43.4 | 43.4 | 43.4 | 43.3 |
| pH | 2.5 | 2.5 | 2.6 | 3.5 |
| Particle Size, nm | 196 | 128 | 107 | 102 |
| Theo. Particle Size | 199 | 131 | 100 | 108 |

TABLE I
Effect of MAA Level in Shell on Glass Transition Temperature

| % MAA in Shell | Tg °C. Onset/Inflection |
|---|---|
| 20 | 127/138 |
| 22 | 130/143 |
| 24 | 136/147 |
| 26 | 137/149 |
| 28 | 139/153 |
| 30 | 147/155 |

TABLE II
Effect of Acid Level and CTA on Performance in Films

| % MAA in Shell | CTA[c] | % Solids | pH | Rheology[a] Index | Gloss 60° C. Porous Substrate | Heat Seal[b] Resistance 125 C. | 150 C. | 175 C. |
|---|---|---|---|---|---|---|---|---|
| 20 | 3% MMP | 39 | 8.2 | 0.49/.47 | 66/64 | 8/9 | 5/4 | 3/4 |
| 25 | " | 38 | 8.3 | 0.67/.59 | 66/67 | 7/8 | 5/6 | 5/4 |
| 30 | " | 39 | 8.2 | 0.82/.68 | 71/72 | 8/8 | 7/7 | 7/7 |
| 35 | " | 40 | 7.9 | 0.97/.85 | 75/77 | 8/7 | 7/7 | 7/7 |
| 40 | " | 40 | 7.5 | —/.92 | 72/72 | 7/8 | 7/7 | 8/7 |
| 35 | 6% nDoDM | 29 | 8.6 | .77/.64 | 64/68 | 8/9 | 7/8 | 9/8 |
| 40 | " | 29 | 8.7 | .79/.71 | 65/68 | 8/8 | 7/7 | 9/8 |

[a]Ratio of high shear (ICI) to low shear (Brookfield) before and after heating 10 days at 60° C. (140° F.).
[b]Face to cellophane, 1.6 kg/cm²/2 seconds, before and after heat aging for 10 days at 60° C. (140° F.), relative values of 1-10 with 10 the best.
[c]50% shell polymer present in SSP.

TABLE III
Effect of Molecular Weight[a] on Performance in Films

| Wt. % CTA[e] in Shell | % Solids | pH | R.I.[b] | Porous Substrate Gloss 60 | Heat Seal Resistance[c] 150° | Water Resistance[d] |
|---|---|---|---|---|---|---|
| 2 | 33.4 | 8.6 | 0.5/0.5 | 63 | 5.5 | 10 |
| 2.5 | 35.3 | 8.4 | 0.6/.6 | 67 | 3.5 | 10 |
| 3.0 | 38.2 | 8.5 | 0.7/0.7 | 67 | 2.0 | 10 |
| 4.0 | 37.8 | 8.3 | 0.87/.90 | 67 | 1.5 | 10 |
| 5.0 | 37.8 | 8.4 | 1.0/1.0 | 66 | 1.0 | 10 |

[a]50% shell polymer containing 20% MAA, present in SSP.
[b]Rheology Index (See Table II)
[c]Face to cellophane, 22 psig/2 sec., 1-10 (10 best)
[d]Sixty minutes contact, after air drying film for 72 hours. Rating 1-10 (10 best).
[e]Methyl ester of 3-mercaptopropionic acid

TABLE IV
Effect of Shell Level on Performance

| Weight % Shell[a] in SSP | 60° C. Gloss Porous Substrate | Heat Resistance[b] |
|---|---|---|
| 30 | 46 | <100° C. |
| 40 | 49 | 125° C. |
| 50 | 63 | 139° C. |

[a]30% MAA in the shell
[b]Face to cellophane

Example 7—Preparation of Core-Shell Polymer Having High Styrene Content

A stirred reactor containing 1645 grams of deionized (D.I.) water, 30.0 grams of sulfated nonylphenoxy polyethoxyethanol [Alipal CO-436 (58% active), from GAF Corp.] and 8.0 grams anhydrous sodium acetate was heated to 87° C. under nitrogen. Next, 108g of monomer emulsion (M.E.) #1 was added to the reactor, followed by 5.0 g ammonium persulfate in 50 g D.I. water. After 15 minutes, the remainder of M.E. #1 was added slowly to the reactor over a 30-minute period, along with cofeed #1 maintaining a reaction temperature of about 85° C. After a 30-minute hold (at 85° C.), monomer emulsion (M.E.) #2 was added slowly to the reactor over a 150-minute period along with cofeed #2 while maintaining a reaction temperature of about 85° C. The reaction was kept at 85° C. for 15 minutes after the addition of M.E. #2 and cofeed #2 was complete. The last traces of monomer were polymerized by addition of a redox chaser (1.0 g t-butyl hydroperoxide, 0.5 g sodium sulfoxylate formaldehyde, 40grams D.I. water and 12 ml of 0.15% ferrous sulfate heptahydrate) added at 55° C.

The resulting emulsion had a solids content of 45%, pH of 4.0 and particle size of about 110 nm. The polymer composition was 15% (65 MMA/10 Styrene/25

MAA with 3.5% Methyl-3-mercaptopropionate as chain transfer agent) and 85% polystyrene.

|  | M.E. #1 | M.E. #2 |
|---|---|---|
| D.I. Water | 96 | 460 |
| Sulfated Nonylphenoxy Polyethoxyethanol[a] | 13.2 | — |
| Sodium Doceylbenzene Sulfate[b] | — | 103.5 |
| Methyl Methacrylate (MMA) | 195 | — |
| Styrene (STY) | 30 | 1700 |
| Methacrylic Acid (MAA) | 75 | — |
| MMP | 10.5 | — |

|  | Cofeed #1 | Cofeed #2 |
|---|---|---|
| D.I. Water | 33 | 167 |
| Ammonium Persulfate | 1.2 | 5.8 |

[a] Alipal CO-436 (58%)
[b] Siponate DS-4 (23%) from Alcolac, Inc.

Example 8—Testing in Formulations Designed for Ink Application

The polymer of Example 7 was admixed with a commercial ink pigment dispersion, a polymeric dispersant, and water, following the recipe below:

| Ingredient | Amount (grams) |
|---|---|
| Pigment Dispersion [Sun Flexiverse Red RFD-1135 (Sun Chemical Co.)] | 40 |
| Polymeric Dispersant [Jon 678 (SC Johnson)] | 25 |
| Isopropanol | 2 |
| Polymer emulsion of Example 7* | 33 |
| Water | 1 |

*Neutralized to pH 8 with $NH_3$

The resultant ink composition exhibited acceptable viscosity, an acceptable ratio of high shear/low shear viscosity, and retained these properties upon standing for several weeks. When applied to paper, the ink exhibited acceptable gloss and dry rub resistance.

Example 9—Testing Vehicle with Commercial Pigment Formulations

A core-shell polymer was prepared as in Example 1, except that ⅔ of the core MAA was replaced with BA, and the MMP in the shell was raised to 3.25% by weight of polymer. The pH was adjusted to 8 with ammonia. Total solids of the polymer emulsion were 40%. The emulsion was then blended with two commercial color dispersants (Sun GPI Color Bases Phthalo Green and DNA Orange) at a 52:48 weight ratio of emulsion/color dispersant and diluted with water to a 25-30 second viscosity (#2 Zahn cup). Acceptable viscosity stability was seen for both formulations after seven days.

The samples were diluted to 16% pigment weight solids and applied to heat-resistant porous litho paper. These samples were compared to a control sample containing the same colors and pigment solids and a commercially available letdown vehicle (Joncryl 87 from SC Johnson, Inc.) The formulation of the present invention had equal ink transfer and rub resistance as the control sample and better stability on storage at 60 degrees C. for seven days.

Example 10—Preparation of a Three-Stage, Core-Shell Polymer Particles

A reaction vessel with provisions for heating and cooling was equipped with nitrogen inlet, mechanical stirrer, and provisions for the gradual addition of monomer emulsion and cofeed catalyst. The vessel was charged with 7228.6 g deionized water and 17.5 g 28% sodium lauryl sulfate, and the stirred mixture inerted with nitrogen and heated to 80°-84° C. The stage one monomer emulsion was prepared from 1735.7 g deionized water, 186 g 28% sodium lauryl sulfate, 2603.5 g n-butyl acrylate, 2525.4 g methyl methacrylate, and 78.1 g methacrylic acid. A seed charge of 308 g of the stage one monomer emulsion was added to the kettle, and, after about 15 minutes, a kettle catalyst charge of 13 g ammonium persulfate in 260.4 g deionized water was added. After 10-20 minutes, a cofeed catalyst consisting of 7.8 g ammonium persulfate in 572.8 g deionized water, and the remaining stage one monomer emulsion were gradually added over 1.75-2.25 hours to the stirred reaction mixture which was maintained at 80°-84° C.

After the addition of stage one monomer emulsion was complete, the addition vessel was rinsed with 208.3 g deionized water. After the rinse was completed, there was a 15-30 minute hold during which the stage two monomer emulsion was prepared from 433.9 g deionized water, 22.4 g sulfated nonylphenoxy polyethoxyethanol emulsifier [Alipal CO-436 (58%)], 499.9 g n-butyl acrylate, 661.3 g methyl methacrylate, 140.6 g methacrylic acid, and 26.0 g n-dodecyl mercaptan. The stage two monomer emulsion was then gradually added over 45-60 minutes concurrent with a catalyst cofeed consisting of 2.6 g ammonium persulfate in 195.3 g deionized water. The catalyst cofeed was added at such a rate so as to extend 15-30 minutes beyond the end of the stage two monomer emulsion feed.

After the addition of stage two monomer emulsion was complete, the addition vessel was rinsed with 52.1 g deionized water. After the rinse was completed, there was a 15-30 minute hold during which the stage three monomer emulsion was prepared from 433.9 g deionized water, 22.4 g Alipal CO-436 (58%), 1041.1 g methyl methacrylate, 260.3 g methacrylic acid, and 52.1 g n-dodecyl mercaptan. The stage three monomer emulsion was then gradually added over 45-60 minutes concurrent with a catalyst cofeed consisting of 2.6 g ammonium persulfate in 195.3 g deionized water. The catalyst cofeed was added at such a rate so as to extend 15-30 minutes beyond the end of the stage three monomer emulsion feed.

After the addition of stage three monomer emulsion was complete, the addition vessel was rinsed with 52.1 g deionized water. The emulsion was then cooled and a redox chaser consisting of 4.7 g t-BHP in 47 g deionized water, 2.3 g sodium sulfoxylate formaldehyde in 70 g deionized water, and 24.5 g of 0.15% ferrous sulfate solution was added at 50°-60° C. Two further chasers each consisting of 73 g 30% hydrogen peroxide and 48 g deionized water were added at 20 minute intervals subsequent to the initial chaser. After further cooling to below 35° C., the latex was filtered through 100 mesh screen. Properties for the resultant latex were: 40% solids, pH 2.2, 170 nm particle size, and 12 cps Brookfield viscosity.

Example 11—Polymer Isolation as a Solid and Use in Portland Cement Modifiers A slurry consisting of 28.8 grams slaked lime and 3.2 grams soda ash in 96 ml deionized $H_2O$ was added with continuous agitation to 2000 grams of the emulsion prepared in Example 10. The neutralized emulsion was then spray-dried using a Bowen Model BLSA laboratory spray drier. Inlet air temperature was first adjusted to 150° C. and then emulsion feed rate adjusted so as to provide outlet temperature of 65° C. Concurrently, a solid anticaking agent of the type taught in U.S. Pat. No. 3,985,704 is introduced to the top of the drying chamber at a rate to yield 5% in the final product. The resulting product had a moisture content of 1.7% and was a free-flowing white powder with averaged particles size of 60 microns.

Fifty grams of the spray dried powder prepared above were combined in a Hobart mixer with 7250 grams of 600 mesh sand, 500 grams of Portland Type I gray cement, and 5 grams solid defoamer (Colloids 523DD). Approximately 225 ml of tap water were added to yield a mortar with outstanding consistency, workability and trowelability. After suitable curing time under ambient conditions, the modified mortar possessed excellent adhesion to various substrates and had improved mechanical strength properties relative to unmodified mortars.

Example 12—Core-Shell Polymers Having Varying Compositions

Using the process of Example 1, core-shell polymers werer made with varying monomer content, core to shell ratio, and chain transfer agent level. The final polymer compositions are shown below. Particle sizes were in the range of 100–125 nm.

| Sample | Composition (by weight) Core//Shell |
|---|---|
| A | 45 (65BA/34.5MAA/0.5MMA)//55 [80MMA/20MAA (3.25 MMP)] |
| B | 25 (65BA/34.5MMA/0.5MAA)//75 [40EA/40MMA/20MAA (3.25 MMP)] |
| C | 25 (65BA/34.5MMA/0.5MAA)//75 [80MMA/20MAA (3.25 MMP)] |
| D | 75 (65BA/34.5MMA/0.5MAA)//25 [40EA/40MMA/20MAA (3.25 MMP)] |
| E | 75 (65BA/34.5MMA/0.5MAA)//25 [80MMA/20MAA (3.25 MMP)] |
| F | 50 (65BA/34.5MMA/0.5MMA)//50 [85MMA/15MAA (6.02 MMP)] |
| G | 50 (65BA/34.5MMA/0.5MAA)//50 [85 MMA/15MAA (3.25 MMP)] |
| H | 50 (65BA/34.5MMA/0.5MAA)//50 [77.5MMA/22.5MAA (4.21 MMP)] |

Example 13—Preparation of Core-Shell Polymers by Inverse Polymerization

In this procedure, the shell polymer was prepared first, followed by polymerization of the high molecular weight core polymer.

A stirred reactor containing 840 grams deionized (D.I.) water, 2.2 grams of ammonium lauryl sulfate, and 1.44 grams of sodium acetate trihydrate was heated, under a nitrogen atmosphere, to 88° C. The reaction was initiated by the addition of 35 grams of monomer emulsion #1 (M.E. #1) given below and 1.44 grams of ammonium persulfate dissolved in 30 grams of D.I. Water. After 15 minutes, the nitrogen was removed, the temperature was decreased to 85° C., and the remaining M.E. #1, along with 1.8 grams of ammonium persulfate (APS) in 100 grams of D.I. water, were added simultaneously over 80 minutes. Following this, 0.6 grams of ammonium lauryl sulfate and 1.44 grams of APS in 82 grams of D.I. water, were added during a 30 minute thermal hold (88° C.). M.E. #2 along with 0.72 grams of APS in 100 grams of D.I. water, were then added simultaneously over 80 minutes at 83° C. After finishing the feeds, the reaction was held at 83° C. for 30 minutes. The last traces of monomer were polymerized by addition of a redox chaser (0.8 grams 70% t-butyl hydroperoxide, 0.4 grams sodium sulfoxylate formaldehyde, 24 grams D.I. and 4 ml of 0.15% ferrous sulfate heptahydrate) added at 55° C. Residual mercaptan was oxidized with 13.8 grams of 30% hydrogen peroxide.

After diluting the polymer system to about 38.0% solids with D.I. water, it was neutralized to a pH of 7.5 with aqueous ammonia, giving a final solids of about 35% and a particle size of 130 nm.

|  | M.E. #1 (shell) | M.E. #2 (core) |
|---|---|---|
| D.I. Water | 285 | 263 |
| Ammonium Lauryl Sulfate | 3.6 | 10.3 |
| Butyl Acrylate | — | 468 |
| Methyl Methacrylate | 504 | 248.4 |
| Methacrylic Acid | 216 | 3.6 |
| n-Dodecyl Mercaptan (nDDM) | 39.4 | — |
| Water, rinse | 90 | 40 |
| Final % Solids | 36.4% | 44.8% |
| Particle Size, nm | — | 126 |

Example 14—Preparation of Core-Shell Polymers Having Varying Compositions by Inverse Polymerization Using the process of example 13, core-shell polymers were made with varying monomer content and chain transfer agent level. The final polymer compositions are shown below. Particle sizes were in the range of 100–130 nm.

| Sample | Composition (by weight) Core//Shell |
|---|---|
| A | 50 (65BA/34.5MMA/0.5MAA)//50 [70MMA/30MAA (5.47 nDDM)] |
| B | 50 (65BA/34.5MMA/0.5MAA)//50 [85MMA/15MAA (5.47 nDDM)] |
| C | 50 (65BA/34.5MMA/0.5MAA)//50 [85MMA/15MAA (10.1 nDDM)] |
| D | 50 (65BA/34.5MMA/0.5MAA)//50 [70MMA/30MAA (10.1 nDDM)] |
| E | 50 (65BA/34.5MMA/0.5MAA)//50 [77.5MMA/22.5MAA (7.1 nDDM)] |

Example 15—Preparation of Core-Shell Polymers For Use In Leather Embossing

Following the procedures in Example 1, core-shell polymers were prepared having the following composition:

| Sample | Composition (by weight) Shell (wt. %) (80 MMA/20 MAA) | Core |
|---|---|---|
| A | 30 | BA |
| B | 20 | 1 BA/1 MMA |
| C | 30 | 1 BA/1 MMA |
| D | 40 | 1 BA/1 MMA |
| E | 50 | 1 BA/1 MMA |
| F | 55 | 2 BA/1 MMA |
| G | 60 | 1 BA/1 MMA |

The polymers prepared above were independently incorporated into a typical leather embossing finish comprising 15–30 parts core-shell polymer, 40–60 parts water, 5–10 parts coalescents, 0.1–0.5 parts surfactant, 0.1–0.5 parts foam suppressant, 2–5 parts thickening agent, 0.2–0.5 parts ammonia, 3–5 parts wax, and 8–20 parts 2-staged heteropolymer latex. These embossing finishes were then applied to a test leather surface by spray or roll coating to serve as an embossing release coat. The coated surfaces were compressed by heat and pressure with a metal platen (press conditions: 210° F., 35 tons, 3 second dwell time). These coatings were evaluated for hot plate release and compared to a control embossing coat formulation containing none of the core-shell polymers of this invention. The results of this evaluation are given below:

| Sample | Hot Plate Release |
|---|---|
| Control | Fair |
| A | Fair |
| B | Fair - Good |
| C | Good - Very Good |
| D | Good - Very Good |
| E | Good - Very Good |
| F | Very Good - Excellent |
| G | Very Good - Excellent |

Example 16—Preparation of Core-Shell polymers for Floor Polish

A core monomer emulsion was prepared by mixing the following ingredients:

| Ingredients | Amount (grams) |
|---|---|
| D. I. Water | 560 |
| Sodium Lauryl Sulfate (28% solids) | 21 |
| Butyl Acrylate | 1190 |
| Methyl Methacrylate | 631 |
| Methacrylic Acid | 9 |

80% of the monomer emulsion was added to a 5-liter glass reactor containing 1160 grams deionized water and 2.3 grams sodium lauryl sulfate solution (28% solids). The reactor was fitted with a thermometer, stirrer and feed lines. The mixture was heated to 82°–84° C. and a polymerization initiator (6.4 grams ammonium persulfate dissolved in 40 grams of deionized water) was added. An exotherm of 2°–4° C. was observed and then the remaining monomer emulsion was added over a period of 2½ hours. Slight cooling was required to maintain a temperature of 83°–86° C. After complete addition of the monomer emulsion, the mixture was maintained at 80°–84° C. for 15 minutes.

Shell monomer emulsions containing deionized water, emulsifier, methyl methacrylate, methacrylic acid, and methyl mercaptopropionate were overpolymerized on the core polymer emulsion to prepare core-shell polymers having the following composition:

| Sample | Composition (shell)//(core) |
|---|---|
| A | 35%(65%MMA/35%MAA)//65%(65%BA/34.5%MMA/0.5MAA) |
| B | 35%(80%MMA/20%MAA)//65%(65%BA/34.5MMA/0.5MAA) |
| C | 50%(65%MMA/35%MAA)//50%(65%BA/34.5MMA/0.5MAA) |

The above core-shell polymer latices were evaluated in floor polish formulations given in the table below and compared to control No. 1 (45% MMA/45% BA/10% MAA) and Control No. 2 (52% MMA/28% BA/12% STY/8% MAA). The controls were prepared following the examples of U.S. Pat. No. 3,808,036.

Vinyl composition tiles were used as the test substrates to examine the gloss of formulated systems. The tile surfaces were cleaned with a commercial cleaning compound, rinsed with water and allowed to air dry. The formulations were applied to the substrates volumetrically (amount depending on surface area) and dispersed evenly with a gauze sponge. After one hour at ambient conditions, the level of gloss was determined visually and by use of 60 and 20 Gardner gloss meters.

Floor Polish Formulations (grams)

| Ingredients | Sample A | Sample B | Sample C | Control No. 1 | Control No. 2 |
|---|---|---|---|---|---|
| Water | 35 | 39.9 | 42.7 | 43.2 | 37.5 |
| FC-120(1%)[a] | 1 | 1 | 1 | 1 | 1 |
| SWS-211(50%)[b] | 0.02 | 0.02 | 0.02 | 0.02 | 0.02 |
| Diethylene Glycol Monoethyl Ether | 5 | 5 | 5 | 5 | 7 |
| Tributoxy Ethyl Phosphate | 1 | 1 | 1 | 1 | 1.5 |
| NH$_3$(28%) | 0.4 | 0.4 | 0.4 | 0.4 | 0.4 |
| Polymer | 65 | 60.1 | 57.3 | 56.8 | 6.25 |
| Properties | | | | | |
| Latex Solids | 38.5 | 41.6 | 43.6 | 44 | 40 |
| 60° gloss | 71 | 64 | 73 | 54 | 62 |
| 20° gloss | 38 | 25 | 39 | 19 | 23 |

[a]Flurocarbon surfactant - 3M Co
[b]Silane defoamer - Stauffer Wacker Chemicals As shown in the above table, the core-shell polymers of this invention provide gloss performance in floor polishes which is superior to a conventional acrylic emulsion (Control No. 1) and equal or better than a styrenated acrylic emulsion (Control No. 2).

Example 17—Preparation of Core-shell Polymers For Use In High Gloss Paint

A stirred reactor containing 950 grams deionized (D.I.) water, 9.0 grams sodium lauryl sulfate, and 9.0 grams sodium acetate trihydrate was heated under a nitrogen atmosphere to 81° C. The reaction was initiated by the addition of 50 grams of monomer emulsion #1 (M.E.#1) given below, turning off the nitrogen flow, and adding 1.6 grams of ammonium persulfate dissolved in 40 grams of D.I. water. After 19 minutes, with the temperature at 81° C., the remaining M.E. #1 (to which 9.6 grams of n-Dodecyl Mercaptan had been added, along with 0.42 grams ammonium persulfate in 25 grams D.I. water) were added simultaneously over 18 minutes. Next, 20 grams D.I. water were added and the reaction mixture held at 81° C. for 10 minutes. M.E. #2 and 3.7 grams ammonium persulfate in 200 grams D.I. water were then added simultaneously over a period of 158 minutes and 192 minutes respectively. After the M.E. #2 feed, 40 grams D.I. water were added and the reaction was held at 81° C. for 34 minutes until the persulfate feed was completed. The last traces of monomer were polymerized by addition of a redox chaser (1.0 grams 70% t-butyl hydroperoxide, 0.5 grams sodium sulfoxylate formaldehyde, 30 grams D.I. water and 5 grams sodium sulfoxylate formaldehyde, 30 grams D.I. water and 5 grams of 0.15% ferrous sulfate heptahydrate) added at 55° C. Residual mercaptan was oxidized with 70 grams of 5.7% hydrogen peroxide at 50° C. After diluting the polymer composition to 45.8% solids with D.I. water, it was neutralized to a pH of 8.25. The particle size was 175 nm.

|  | M.E. #1 (shell) | M.E. #2 (core) |
|---|---|---|
| D.I. water | 53.0 | 477.0 |
| Sodium lauryl sulfate | 0.8 | 6.2 |
| Methyl Methacrylate | 128.0 | 165.6 |
| Methacrylic acid | 32.0 | — |
| 2-Ethylhexyl acrylate | — | 308.2 |
| Butyl Methacrylate | — | 555.8 |
| Styrene | — | 410.4 |

Example 18—Preparation of Core-Shell Polymers For Use in High Gloss Paints

A stirred reactor containing 950 grams deionized (D.I.) water, 9.0 grams sodium lauryl sulfate, and 9.0 grams sodium acetate trihydrate was heated under a nitrogen atmosphere to 81° C. The reaction was initiated turning off the nitrogen flow, and adding 1.6 grams of ammonium persulfate dissolved in 40 grams of D.I. water. After 19 minutes, with the temperature at 81° C., the remaining M.E. #1 (to which 19.2 grams of n-Dodecyl Mercaptan had been added, along with 0.82 grams ammoinum persulfate in grams D.I. water) was added simultaneously over 34 minutes. Next 20 grams D.I. water were added and the reaction mixture held at 81° C. for 10 minutes M.E. #2, given below, was added over a period of 147 minutes, along with 33 grams of ammonium persulfate in 175 grams D.I. water which was added over a period of 177 minutes. After addition of the M.E. #2 feed, 40 grams D.I. water was added and the reaction was held at 81° C. for 30 minutes until the persulfate feed was complete. The last traces of monomer were polymerized by addition of redox chaser (1.0 grams of 70% t-butyl hydroperoxide, 0.5 grams of sodium sulfoxylate formaldehyde, 30 grams D.I. water, and 5 grams of 0.15% ferrous sulfate heptahydrate) added at 55° C. Residual mercaptan was oxidized with 70 grams of 5.7% hydrogen peroxide at 48° C. After diluting the polymer composition to 45.5% solids with D.I. water, it was neutralized to a pH of 8.15. The particle size was 139 nm.

|  | M.E. #1 (shell) | M.E. #2 (core) |
|---|---|---|
| D.I. water | 106.0 | 424.0 |
| Sodium lauryl sulfate | 1.6 | 5.5 |
| Methyl Methacrylate | 256.0 | 147.2 |
| Methacrylic acid | 64.0 | — |
| 2-Ethylhexyl acrylate | — | 273.9 |
| Butyl Methacrylate | — | 494.1 |
| Styrene | — | 364.8 |

Example 19—Preparation of Core-Shell Polymers For Use in High Gloss Paint

A stirred reactor containing 950 grams deionized (D.I.) water, 9.0 grams sodium lauryl sulfate, and 9.0 grams sodium acetate trihydrate was heated under a nitrogen atmosphere to 81° C. The reaction was initiated by the addition of 50 grams of monomer emulsion #1 (M.E. #1) given below, turning off the nitrogen flow, and adding 1.6 grams of ammonium persulfate dissolved in 40 grams of D.I. water. After 19 minutes, with the temperature at 81° C., the remaining M.E. #1 (to which 48. grams of n-Dodecyl Mercaptan had been added, along with 2.1 grams ammonium pursulfate in 125 grams D.I. water) was added simultaneously over 90 minutes. Next, 20 grams D.I. water were added and the reaction mixture held at 81° C. for 30 minutes M.E. #2, along with 2.02 grams ammonium persulfate in 100 grams of D.I. water, were then added simultaneously over 87 minutes. Next, 40 grams D.I. water were added and the reaction was held at 81° C. for 30 minutes. The last traces of monomer were polymerized by addition of a redox chaser (1.0 grams of 70% t-butyl hydroperoxide, 0.5 grams of sodium sulfoxylate formaldehyde, 30 grams of D.I. water, and 5 grams of 0.15% ferrous sulfate heptahydrate) added at 55° C. After diluting the polymer composition to about 46% solids with D.I. water, it was neutralized to a pH of 8.8. The particle size was 114 nm. The final composition was diluted to 38.1% solids with D.I. water.

|  | M.E. #1 (shell) | M.E. #2 (core) |
|---|---|---|
| D.I. water | 265.0 | 265.0 |
| Sodium lauryl sulfate | 4.0 | 3.44 |
| Methyl Methacrylate | 640.0 | 92.0 |
| Methacrylic acid | 160.0 | — |
| 2-Ethylhexyl acrylate | — | 171.2 |
| Butyl Methacrylate | — | 308.8 |
| Styrene | — | 228.0 |

Example 20—Paint Formulations Containing Core-Shell Polymers

Paint formulations were prepared using the core-shell polymers from Examples 17, 18, and 19 according to the recipe given below. These paints were then tested for performance properties and all exhibited good block resistance, gloss and open time.

| Ingredients | Paint A | Paint B | Paint C |
|---|---|---|---|
| GRIND |  |  |  |
| Methyl Carbitol[a] | 45.0 | 45.0 | 45.0 |
| Dispersant[b] | 23.0 | 23.0 | 23.0 |
| Defoamer[c] | 2.0 | 2.0 | 2.0 |
| TiO$_2$ | 200.0 | 200.0 | 200.0 |
| D.I. water | 20.0 | 20.0 | 20.0 |

-continued

| Ingredients | Paint A | Paint B | Paint C |
|---|---|---|---|
| LET DOWN | | | |
| Polymer Emulsion (Ex 17) | 475.5 | — | — |
| Polymer Emulsion (Ex. 18) | — | 487.7 | — |
| Polymer Emulsion (Ex. 19) | — | — | 616.0 |
| Texanol$^{(d)}$ | 29.4 | 26.6 | 17.6 |
| Defoamer$^{(c)}$ | 2.0 | 2.0 | 2.0 |
| Ammonia | 1.5 | 1.0 | — |
| Thickener (20.8% solids)$^{(e)}$ | 48.0 | 80.0 | 40.0 |
| D.I. water | 162.0 | 124.8 | 58.6 |

$^{(a)}$Diethylene glycol, methyl ether from Union Carbide Corp.
$^{(b)}$QR-681M from Rohm and Haas Co.
$^{(c)}$Foammaster AP from Diamond Shamrock Chem. Co.
$^{(d)}$2,2,4-trimethyl-1,3-pentanediol monoisobutyrate from Eastman Chem. Co.
$^{(e)}$QR-1001 from Rohm and Haas Co.

We claim:

1. A composition comprising a core-shell polymer having an alkali-insoluble, emulsion polymer core and an alkali-soluble, emulsion polymer shell attached or associated with said core so that upon dissolving said shell with alkali, a portion of said shell remains attached or associated with said core, wherein the weight ratio of core polymer to shell polymer is about 99:1 to about 1:99 and said core and shell are each independently polymerized from monomer systems comprised of monomers selected from the group consisting of methyl acrylate, ethyl acrylate, butyl acrylate, 2-ethylhexyl acrylate, decyl acrylate, methyl methacrylate, ethyl methacrylate, butyl methacrylate, acrylonitrile, acrylic acid, methacrylic acid, itaconic acid, maleic acid, fumaric acid, styrene, substituted styrene, vinyl acetate, and other $C_1$ to $C_{12}$ alkyl acrylates.

2. The composition of claim 1 wherein the weight average molecular weight, as determined by gel permeation chromatography, of said shell polymer is about 5,000 to about 50,000 and said core polymer is greater than about 50,000.

3. The composition of claim 1 wherein the $T_g$ of said core polymer is about −20° C. to about 30° C.

4. The composition of claim 1 wherein said core polymer is polymerized first to a particle size of about 60 to 140 nm.

5. The composition of claim 1 wherein said core polymer is polymerized second, and due to the hydrophobicity of the core polymer, it becomes a domain within the particles of the alkali-soluble shell polymer.

6. The composition of claim 1 wherein said shell polymer has a $T_g$ of at least about 100° C.

7. The composition of claim 1 wherein said shell polymer is polymerized from a mixture of unsaturated monomers comprising about 10% to about 60% by weight acid-containing unsaturated monomer and said core polymer is polymerized from a monomer mixture comprising less than about 3% by weight acid-containing unsaturated monomer.

8. The composition of claim 7 wherein said shell is polymerized from a monomer mixture comprising about 20 to 50% methacrylic acid and said core is polymerized from a monomer mixture comprising about 0.01% to about 1.5% methacrylic acid.

9. The composition of claim 8 wherein said core polymer is polymerized from a monomer mixture containing about 0.3% to about 0.7% by weight methacrylic acid.

10. The composition of claim 1 wherein said shell polymer has been neutralized and substantially, but not totally, dissolved so as to form a blend of neutralized core-shell polymer and an aqueous solution of neutralized shell polymer.

11. The composition of claim 10 wherein said shell polymer is dissolved with a base selected from the group consisting of ammonia, triethylamine, monoethanolamine and dimethylaminoethanol.

12. The composition of claim 1 wherein said core is polymerized from a monomer mixture free of carboxylic acid.

13. The composition of claim 1 wherein the weight ratio of core polymer to shell polymer is about 80:20 to about 20:80.

14. The composition of claim 1 wherein the weight ratio of core polymer to shell polymer is about 65:35 to 35:65.

15. The composition of claim 1 wherein the weight ratio of core polymer to shell polymer is about 60:40 to about 40:60.

16. Process for preparing the composition of claim 1 wherein the core polymer and shell polymer are sequentially polymerized.

17. Process comprising applying the composition of claim 10 to a substrate as a heat-resistant clear overprint varnish.

18. A hydraulic cement composition containing the core-shell polymer of claim 1.

19. A process for modifying cement comprising incorporating therein the core-shell polymer of claim 1.

20. A process of claim 19 wherein said core-shell polymer has been spray-dried to give free-flowing, dried particles.

21. An ink or paint composition containing the core-shell polymer of claim 1, a pigment and a dispersing agent.

22. A paint composition of claim 21 containing at least one, wetting agent, rheology modifier, coalescent, base and drying retarder.

* * * * *